INVENTOR
ROY F. DEHN

INVENTOR
ROY F. DEHN

United States Patent Office 3,449,532
Patented June 10, 1969

3,449,532
CONDUCTOR BAR TYPE ELECTRICAL
DISTRIBUTION SYSTEM
Roy F. Dehn, Wickliffe, Ohio, assignor to McNeil Corporation, Wickliffe, Ohio, a corporation of Ohio
Application Oct. 8, 1965, Ser. No. 494,187, now Patent No. 3,325,606, dated June 13, 1967, which is a continuation-in-part of application Ser. No. 313,959, Oct. 4, 1963. Divided and this application Jan. 20, 1967, Ser. No. 610,580
Int. Cl. B60m 1/34
U.S. Cl. 191—29       5 Claims

ABSTRACT OF THE DISCLOSURE

An electric power distribution trolley-type conductor rail comprising a plurality of conductors arranged end to end and adapted to be engaged by a current collector movable therealong. Each conductor member comprising a first member of high electrical conductivity having web and flange portions and longitudinally extending surfaces inclined in opposite directions with respect to the plane of the web portion and a second member of relatively high strength, the two members being fixedly secured together by mechanical fastening means at longitudinally spaced intervals throughout their length. The second member having an upper flange forming a surface to be engaged by a current collector. Adjoining ends of adjacent conductor members being connected together by splice plates having inclined surfaces adapted to wedge against the inclined surfaces of the conductor members. The conductor members are so constructed that they can be cut transversely at any point and secured together by the splice which are constructed such that the insulator for supporting the conductor rails can be located at any place throughout the length thereof.

---

This application is a division of application, Ser. No. 494,187, filed Oct. 8, 1965, now patent No. 3,325,606, which is a continuation-in-part of application, Ser. No. 313,959, filed Oct. 4, 1963, now Patent No. 3,222,464. The subject matters of the aforesaid applications are included herein by reference.

A trolley-type electric power conductor bar, preferably of composite construction and having the parts thereof connected together at spaced intervals by fasteners which are flush or substantially flush with the bar, and/or a conductor rail comprising a plurality of power conductor bars connected end to end by splice plates of an electric power distribution system preferably for an electrified railway, the rail being capable of being supported by discrete insulators located at any place throughout its length which limit movement of the rail transversely of its length while permitting longitudinal movement of the rail.

Prior to the present invention, electric power distribution systems for personnel and/or material handling systems, particularly those made up of composite conductors connected end to end by splice plates were such that the supporting insulators had to be connected thereto at specific places thus making installation more difficult and increasing the cost of the system.

One of the principal objects of the present invention is the provision of a novel and improved trolley-type electric conductor, preferably one comprising portions made of different types of material, one being of relatively high strength and good wearing characteristics serving as that part of the conductor bar engaged by the trolley or current collector and the other being of relatively high conductivity serving as a primary current carrying part of the bar and wherein portions are joined together by mechanical fasteners in such a manner that good electrical transfer takes place between the different portions, and with which the same supporting insulator can be used at any place throughout its length.

Another of the principal objects of the invention is the provision of a new and improved trolley-type electric power distribution rail made up of a plurality of conductor bars connected end to end by splice plates which can be supported by insulators installed at any convenient location along the rail and which restrains lateral and vertical movements of the rail while permitting the rail to shift longitudinally during expansion and contraction thereof caused, for example, by temperature changes.

Figure 1:
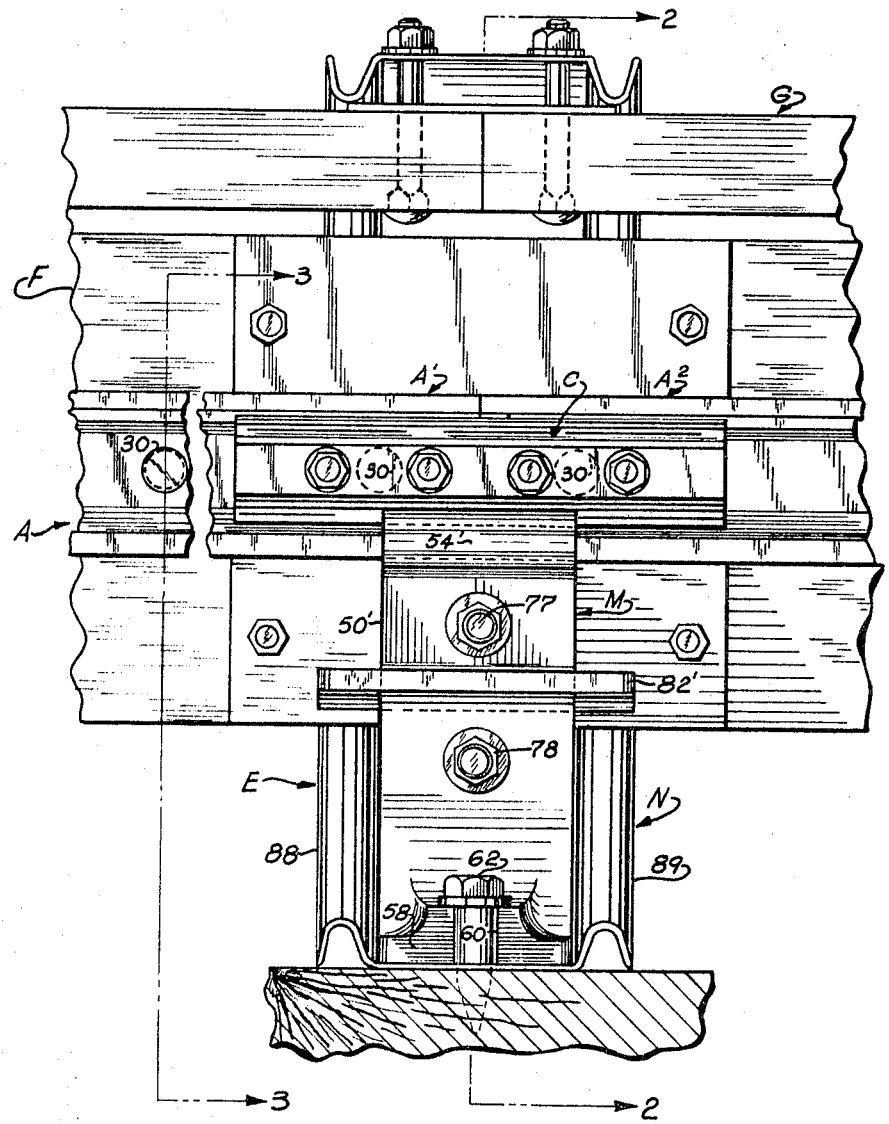
Figure 2:
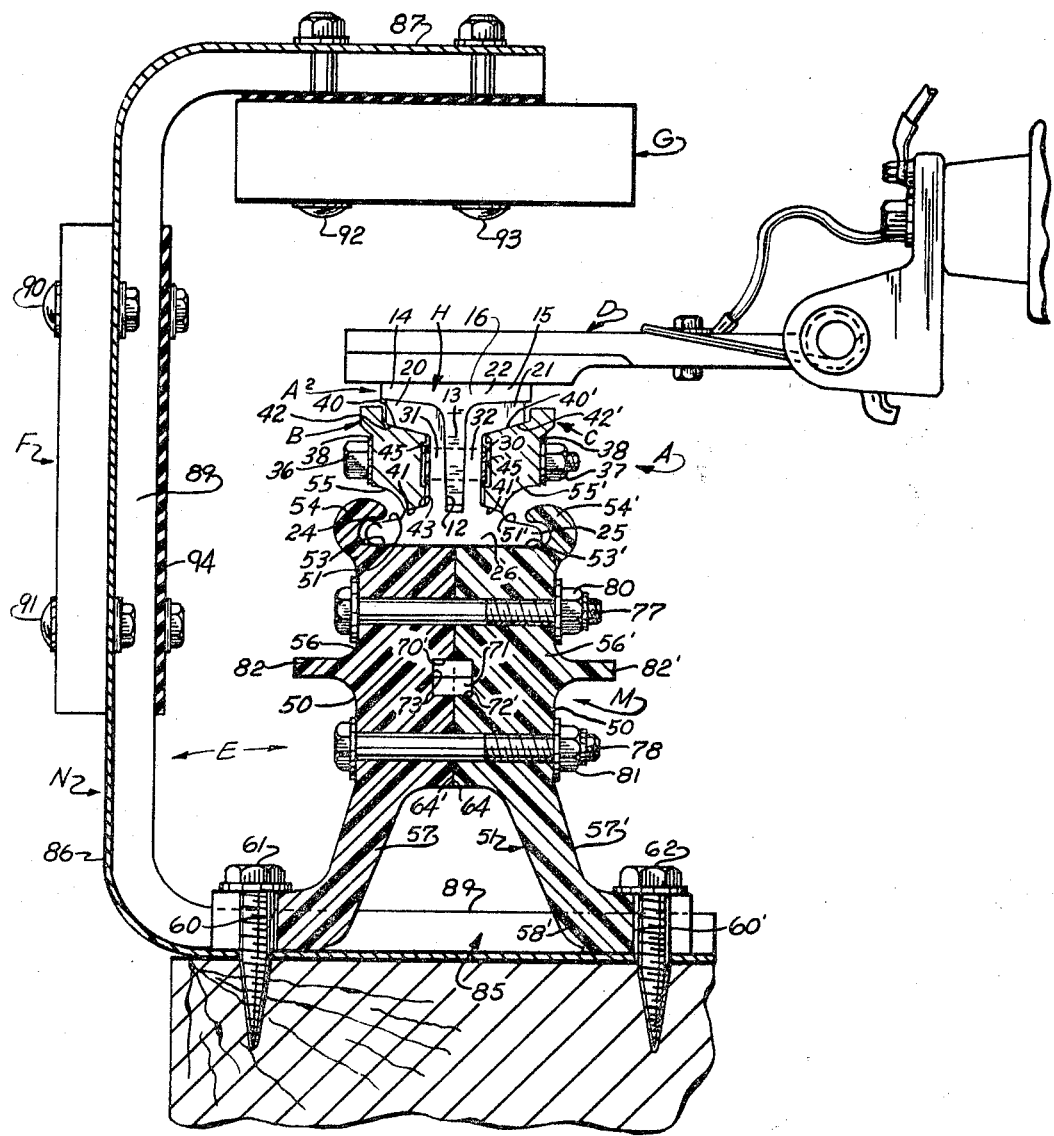

The invention resides in certain constructions and combinations and arrangement of parts, and other objects and advantages of the invention will be apparent from the following description of a preferred form thereof, reference being made to the accompanying drawings wherein:

FIG. 1 is a fragmentary, side elevational view of an electric power distribution system for an electrified railway including an electric power trolley-type conductor rail embodying the present invention; and FIG. 2 is a sectional view taken substantially along line 2—2 of FIG. 1 and, in addition, shows a current collector shoe riding on the power conductor or rail of the system.

Referring to the drawings, the reference character A designates generally an electric trolley-type conductor or rail comprising a number of conductor bars or rail sections $A^1$, $A^2$ connected end to end by means including a pair of splice plates B and C and installed alongside a railway, not shown, to supply current to electrically powered vehicles on the railway through a collector shoe assembly D connected to the vehicles. The rail A is supported at suitable intervals therealong by support structures E, only one of which is shown in the drawings and is shielded by protective boards F and G which extend in end to end relation along one side of the rail and overhead thereof, respectively.

Each of the conductor bars or rail sections $A^1$ and $A^2$ is a composite structure formed of a first elongated rail member H of high strength and good wearing qualities, for example, steel, having a cross-sectional shape generally similar to that of a T-beam and a second elongated rail member K of relatively high electrical conductivity, for example, aluminum, having a cross-sectional shape generally similar to that of an I-beam and a medial longitudinal extending slot 12 in one flange side thereof into which the web or stem 13 of the member H is engaged with the underside of the flange portions 14 and 15 of the flange 16 of the T-shaped member engaging the adjoining sides of the flange portions 20 and 21 of the flange 22 of the I-shaped member K. The slot 12 is preferably of such a depth and the height or depth of the web 13 of the T-shaped member H is such that the web 13 projects downwardly through the flange 22 of the I-shaped member and the web thereof to a point adjacent the sides of the flange portions 24 and 25 of the flange 26 of the I-shaped member, which sides face the flange portions 20 and 21 of the flange 22.

The two members H and K are preferably made to relatively close tolerances, are tightly pressed together with the adjoining surfaces in intimate contact and are fixedly connected together at intervals, of approximately two feet or less.

In the embodiment shown, the two members H and K are fixed secured together at intervals by rivets 30 preferably made of material similar to that of which the member K is formed, which in the present instance is aluminum. The riveting is effected under high pressure which forces the two tined portions 31 and 32 of the member K into tight intimate contact with the adjoining surfaces of the member H. Other types of mechanical fasteners, for example, bolts could be employed in place of rivets. The construction is such that the difference in expansion of the members during use are largely compensated for or counterbalanced and the conductor bars or rail sections remain substantially flat under normal temperature conditions.

The member H, which is made of relatively high strength material having a good wearing quality serves as the part of the conductor bar or rail engaged by the current collector D and the member K made of relatively soft material having high electrical conductivity serves as the primary current carrying part between the feeder connections to the rail A. The composite conductor bars or rail sections incorporate optimum strength and wearing characteristics with optimum current carrying capacity, is of minimum size, requires support at only widely spaced intervals and requires minimum feeder connections. The member H may be a commercially available standard structural steel beam, the member K is preferably an aluminum extrusion. The adjoining surfaces of the two members H and K conform closely to one another thus providing minimum resistance to the transfer of electrical current from the member K of high electrical conductivity to the member H of high strength and good wearing characteristics.

The adjoining ends of any two of the individual conductor bars or rail sections forming the electrified rail A are mechanically and electrically connected by a pair of splice bars or plates B and C at opposite sides of and overlapping the abutting ends of the adjoining rail sections. The splice bars B and C are bolted to the rail sections by bolts 36 which extend through openings in the splice bars and the vertical webs of the rail sections and on which bolts securing nuts 37 are threaded. The holes in the rails through which the bolts 36 project are larger than the bolts, at least lengthwise of the rail A and dish-shaped spring or Belleview-type washers 38 are interposed between the bolt heads and nuts and the adjacent splice bars, respectively, so that a high pressure is maintained between the splice bars and rail sections, but is such that will permit limited relative movement therebetween to accommodate, and expansion and contraction of the conductor bars or rail section. Each of the splice bars B and C have inner inclined surfaces 40, 41 and 40', 41' which conform to the configuration and/or inclination of the inclined adjoining flange surfaces 42, 43 and 42', 43', respectively, of the member K. These are the only surfaces on the flange plates which normally engage the conductor bars or rail surfaces. The construction is such that as the flange plates are bolted in place they wedge against or between the sides of the channels on opposite sides of the rail sections formed by the flange portions 20, 24 and 21, 25, respectively, of the members K. The rivets 30 are fairly flush with the web portion of the conductor bars or rail sections but in order to assure clearance for the rivets adjacent to the ends of the rail sections the side of each of the splice plates facing the web portion is provided with a groove 45.

Each of the support structures E for the rail A comprises a two member insulator assembly M the respective members of which are duplicates of one another. Because the members of the assembly M are duplicates of one another the members and the corresponding parts thereof are designated by the same reference characters with prime marks affixed to the reference characters applied to the right-hand member, as viewed in FIG. 2 of the drawings.

The two member insulator assembly M comprising the members 50 and 50' and the bottom flanges 26 of the rail sections H rest on substantially flat load-bearing or supporting surfaces 53 and 53' thereof. The members 50 and 50' have rail hold-down or retaining flanges 54 and 54' formed integral therewith and extending along opposite sides of the load supporting surfaces 53 and 53' and parallel to the rail. The flanges 54 and 54' curve upwardly and inwardly over the edge portions of opposite sides of the bottom flanges on the rail members. The surface 53 and the hold-down flange 54 form spaced confronting abutments between which the edge portions of the flange portion 24 of flange 26 is supportingly received, and the surface 53' and hold-down flange 54' provide spaced confronting abutments between which an edge portion of the flange portion 25 of the flange 26 is likewise received. The hold-down flanges 54 and 54' which conform to but are slightly spaced from the conductor or conductor rail prevent appreciable lateral or upward movements of the conductor rail relative to the insulator support unit or assembly M and at the same time permit longitudinal shifting of the conductor rail relative to the assembly to accommodate elongation and contraction of the conductor rail which may occur by reason of temperature changes of the conductor. The top sides of the flange portions 24 and 25 of the flange 26 are relieved slightly as indicated at 51, 51' to better accommodate the hold-down flanges 54 and 54' of the assembly M. The splice bars B and C are also undercut or relieved as indicated at 55, 55' to better accommodate or receive the hold-down flanges 54 and 54' where the insulator assemblies are located at the connection of the two conductor bar or rail sections.

The two members 50 and 50' of the insulator assembly M, as previously stated, are duplicates. The members are preferably fabricated or suitable molded resin, such as epoxy, reinforced with fiber glass. Each member includes a block-like body 56 having a supporting leg 57 terminating in a foot portion 58 in which a slot 60 is formed to receive an anchor bolt 61 and 62. The top surface of the body portion 56 of the member 50 forms the load supporting surface 53. In the form shown, the insulator assembly members 50 and 50' have complementary abutting surfaces 64 and 64' which when in contact with one another lie principally on a plane normal to and intersecting that of the load bearing surface for the conductor rail or rail sections, and extending parallel to the direction of the length of the rail sections. The surface of the assembly M which face the conductor bar including the supporting surface formed by the surfaces 53 and 53' and the inner sides of the flanges 54 and 54' are not flat or straight but are curved or beveled lengthwise of the direction in which the conductor bar extends, the high point being adjacent to mid-point of the assembly. In the embodiment shown, these surfaces are beveled at an angle of approximately 7°. This permits the support structure E to be placed on a surface having a slight tilt relative to the conductor bar or rail A without interfering with the conductor bar or rail. Any desired suitable bevel angle or curved arrangement may be empolyed.

Each of the members 50 and 50' is provided with two projecting flanges 70 and 71 offset realtive to one another, which, when the parts are assembled together, engage in complementary grooves 72 and 73 formed in the members 50 and 50.' The ledges or flanges 70 and 71 and the grooves within which they are received form a tongue and groove structure for effecting a strong interlock of the two members 50 and 50'. The members 50 and 50' are also provided with aligned openings which receive securing bolts 77 and 78, respectively, on which nuts 80 and 81 are threaded to tightly clamp the two members 50 and 50' together. In the embodiment shown the members 50 and 50' are provided with flange portions 82 and 82' which reinforce the members and extend the length of the interlocking tongues and grooves without making the members unduly large and heavy.

By forming the insulator assemblies M of two members, they can be readily assembled in supporting relation with the rail A or disassembled and removed from the rail without disturbing or altering the rail.

The insulator assemblies M are each located on a laterally extending foot or base section 85 of a C-shaped bracket N which is preferably formed of a suitable sheet material, such as aluminum, and which in addition to the foot section 85 includes an upright section 86 and an overhead section 87. Ridges 88 and 89 are formed along the opposite side edge portions of the bracket for imparting rigidity thereto and in addition to provide locating means for the feet 58 and 58' of the insulator assemblies M. The base section 85 rests on a suitable foundation which may be a portion of a railway tie T, and the insualtor assembly M and bracket N are anchored to the tie by the screws 61 and 62. It will be appreciated that the bracket N and the insualtor assembly M comprise the support structure E and that the rail A is supported by a multiplicity of these structures located at sutiable intervals throughout its length. The upright portions 86 and overhead portions 87 of the bracket N provide supports for the protector boards F and G, respectively, which boards are secured thereto by suitable carriage bolts 90, 91 and 92, 93, respectively. The boards extend throughout the length of the rail A to partially shield the rail. Preferably, a shield or plate 94 formed of suitable insulating material is bolted to the ridges 88 and 89 of the brackets N to help prevent contact of the current collector with the upright portions 86 of the brackets.

Installation of the supporting insulator assemblies M along the rail A is effected by first separating the members 50 and 50' thereof and then positioning the member 50 so that the under side of rail flange 26 rests on the surface 53 and the hold-down flange 54 overlies the outer edge portion of the flange. The leg 57 of the member is positioned on the section 85 of the bracket N between the ridges 88 and 89 and secured to the bracket and tie T by the screw 61. The member 50' is then manipulated to position surface 53' against the underside of the rail flange 26 with the hold-down flange 54' overlying the upper edge portion of the rail flange. The leg 57' is positioned between the ridges 88 and 89 of the bracket base N and the bolt openings aligned with the corresponding openings in the member 50. The members 50 and 50' are then secured together by the bolts 77 and 78. The member 50' is then fixed to the tie T by inserting the screw 62. It wil be apperciaetd that the interlocking flanges or ledges 70, 71 and 70', 71' and grooves 72, 73 and 72', 73' of the members 50 and 50' assist in maintaining these members in proper alignment.

Should it become necessary to replace any of the insulator assemblies M, the assemblies are readily disassembled by removing the bolts 77 and 78 and the anchor bolts 61 and 62 so that the individual members 50 and 50' can be separated and disengaged from the rail A. A new assembly M may then be easily installed in the manner described, if desired. The support structures may be spaced along the electrified rail A at suitable intervals and initialed or replaced without disturbing the conductor rail. The insulator assemblies M provide positive support for the conductor rail A and limit the rail against lateral and vertical movements while at the same time permitting shifting or slippage thereof in a longitudinal direction.

Although the invention has been shown and described with the conductor rail resting on the support surfaces 53 and 53' of the insulator assemblies, the conductor rail could be supported in an overhead position and inverted with respect to the position shown, in which event, the insulator assemblies would be suspended from suitable overhead support means, and the current collector would be spring-biased upwardly so as to engage the then downwardly facing flange of the wear resistance T-shaped rail member.

While the preferred embodiment of the invention has been described in considerable detail it is to be understood that the invention is not limited to the particular construction shown and it is the intension to cover hereby all modifications and adaptations thereof which come within the practice of those skilled in the art to which the invention relates and the scope of the appended claims.

Having thus described my invention, what I claim is:

1. In an electric power trolley-type conductor of the rail type adapted to be engaged by a collector member, an elongated first member formed of material of relatively high electrical conductivity having a central web portion and flange portions along at least one elongated edge of said web portion extending laterally from opposite sides thereof, said first member having at opposite sides thereof longitudinally extending surfaces coextensive with the length thereof and inclined in opposite directions with respect to the plane of said web portion and an aperture in its upper edge coextensive with the length thereof, an elongated second member formed of material of relatively high strength having a web portion closely received in said aperture and transversely extending flange portions along the edge of said second-mentioned web portion adjacent the opening of said aperture extending laterally from opposite sides forming a collector's shoe slide surface, and mechanical fastening means at longitudinally spaced intervals throughout the length of said members fixedly secured said members together, said mechanical fastening means being approximately flush with the opposite sides of said first-mentioned web portion.

2. In an electric power trolley-type conductor rail adapted to be engaged by a collector member: a plurality of lengths of composite conductor bar arranged end to end and having bolt receiving openings in their adjoining ends; each of said conductor bars comprising an elongated first member formed of material of relatively high electrical conductivity having a central web portion having longitudinally extending surfaces inclined in opposite directions with respect to the plane of said web portion and a flange portion along at least one elongated edge of said web portion extending laterally therefrom, an elongated second member formed of material of relatively high strength having a central web portion and a transversely extending flange portion along one elongated edge thereof forming a collector's shoe slide surface, and means at spaced intervals throughout the length of said members and fixedly securing the same together; means securing said adjoining ends of adjacent conductor bars together comprising splice plates at opposite sides of said adjoining ends and overlying said ends and provided with bolt receiving openings; at least one of said splice plates having inclined surfaces in engagement with said inclined surfaces of said conductor bars; said inclined surfaces being the only engaging surface between said one splice plate and said conductor bars, and bolts extending through said bolt receiving openings in said splice plates and said adjoining ends of said conductor bars clamping said splice plates to said ends of said conductor bars and wedging said engaging inclined surfaces together.

3. In an electric power trolley-type conductor rail adapted to be engaged by a collector member: a plurality of lengths of composite conductor bar arranged end to end and having bolt receiving openings in their adjoining ends; each of said conductor bars comprising an elongated first member formed of material of relatively high electrical conductivity having a central web portion having longitudinally extending surfaces on its opposite sides inclined in opposite directions with respect to the plane of said web portion and flange portions along at least one elongated edge of said web portion extending laterally from opposite sides thereof and said web portion having an aperture in the edge thereof opposite to said one edge coextensive with the length thereof, an elongated second member formed of material of relatively high strength having a web portion closely received in said aperture and a transversely extending flange along one elongated edge thereof overlying and extending laterally from opposite sides thereof forming a collector's shoe slide surface and means at spaced intervals throughout the length of said members and fixedly securing the same together; means securing adjoining ends of adjacent conductor bars together comprising splice plates at opposite sides of said adjoining ends and overlying said ends and provided with bolt receiving openings; said splice plates having inclined surfaces in engagement with said inclined surfaces of said conductor bars; said inclined surfaces being the only engaging surface between said one splice plate and said conductor bars, and bolts extending through said bolt receiving openings in said splice plates and said ends of said conductor bars clamping said splice plates to said ends of said conductor bars and wedging said engaging inclined surfaces together.

4. In an electric power trolley-type conductor rail adapted to be engaged by a collector member: a plurality of lengths of composite conductor bar arranged end to end and having bolt receiving openings in their adjoining ends; each of said conductor bars comprising an elongated first member formed of material of relatively high electrical conductivity having a central web portion having longitudinally extending surfaces on its opposite sides inclined in opposite directions with respect to the plane of said web portion and flange portions along at least one elongated edge of said web portion extending laterally from opposite sides thereof and said web portion having an aperture in the edge thereof opposite to said one edge coextensive with the length thereof, an elongated second member formed of material of relatively high strength having a web portion closely received in said aperture and a transversely extending flange along one elongated edge thereof overlying and extending laterally from opposite sides thereof forming a collector's shoe slide surface, and rivets at spaced intervals throughout the length of said members fixedly securing the same together; means securing adjoining ends of adjacent conductor bars together comprising splice plates at opposite sides of said adjoining ends and overlying said ends and provided with bolt receiving openings; said splice plates having inclined surfaces in engagement with said inclined surfaces of said faces in engagement with said inclined surfaces of said conductor bars; said inclined surfaces being the only engaging surface between said one splice plate and said conductor bars, and bolts extending through said bolt receiving openings in said splice plates and said ends of said conductor bars clamping said splice plates to said ends of said conductor bars and wedging said engaging inclined surfaces together; portions of said one splice plate adjacent to said flange portions of said first member remote from said flange portions of said second member of said conductor bar being cut away to better accommodate supporting assemblies for said conductor bars having portions thereof engaging about the outer edges of said last-referred to flange portions of said first member.

5. In an electric power trolley-type conductor rail adapted to be engaged by a collector member: a plurality of lengths of composite conductor bar arranged end to end having bolt receiving openings in their adjoining ends; each of said conductor bars comprising an elongated first member formed of material of relatively high electrical conductivity having a central web portion and flange portions along opposite elongated edges of said web portion extending laterally from opposite sides thereof and forming with said web outwardly facing channels along opposite sides of said member, said channels having inner inclined side wall surfaces converging toward said web portion, one elongated side of said web portion having an aperture therein coextensive with the length thereof, an elongated second member formed of material of relatively high strength having a web portion closely received in said aperture and a transversely extending flange along one elongated edge thereof overlying and closely engaging the flange portions of said first member extending at opposite sides of the opening of said aperture and forming a collector's shoe slide surface, and rivets at spaced intervals along said members fixedly securing the same together; means securing adjoining ends of adjacent conductor bars together comprising splice plates receive in said channels at opposite sides of said adjoining ends and overlying said ends and having bolt receiving openings therein; said splice plates having inclined surfaces in engagement with said inclined surfaces of said channels in which they are received; said inclined surfaces being the only engaging surface between said one splice plate and said conductor bars, and bolts extending through said bolt openings in said splice plates and said ends of said conductor bars clamping said splice plates to said ends of said conductor bars and wedging said engaging inclined surfaces together; parts of said flange portions of said first member of said conductor bars remote from said flange portions of said second member of said conductor bars and portions of said splice plates adjacent thereto being cut away lengthwise of the conductor bar to better accommodate supporting assemblies for said conductor bars having portions thereof engaging about the outer edges of said last-referred to flange portion of said first member.

References Cited

UNITED STATES PATENTS

| | | | |
|---|---|---|---|
| 1,575,394 | 3/1926 | Tardif | 238—221 |
| 1,005,583 | 10/1911 | Thomson et al. | 238—243 X |
| 1,095,460 | 5/1914 | Denis | 238—139 |
| 1,364,204 | 1/1921 | Montgomery | 238—146 X |
| 2,198,675 | 4/1940 | Magee | 238—243 |
| 3,222,464 | 12/1965 | Dehn | 191—22 |

ARTHUR L. LA POINT, *Primary Examiner.*